INVENTOR
F. J. SCHNEIDER
BY R. P. Miller
ATTORNEY

Nov. 11, 1969 F. J. SCHNEIDER 3,477,630

APPARATUS FOR ASSEMBLING ARTICLES

Filed April 26, 1968 7 Sheets-Sheet 3

Nov. 11, 1969 F. J. SCHNEIDER 3,477,630

APPARATUS FOR ASSEMBLING ARTICLES

Filed April 26, 1968 7 Sheets-Sheet 5

Nov. 11, 1969 F. J. SCHNEIDER 3,477,630

APPARATUS FOR ASSEMBLING ARTICLES

Filed April 26, 1968 7 Sheets-Sheet 6

Nov. 11, 1969 F. J. SCHNEIDER 3,477,630

APPARATUS FOR ASSEMBLING ARTICLES

Filed April 26, 1968 7 Sheets-Sheet 7

United States Patent Office 3,477,630
Patented Nov. 11, 1969

3,477,630

APPARATUS FOR ASSEMBLING ARTICLES

Fred J. Schneider, Catasauqua, Pa., assignor to Western Electric Company, Incorporated, New York, N.Y., a corporation of New York Filed Apr. 26, 1968, Ser. No. 724,380
Int. Cl. B23k *37/04;* B23q *19/00;* H05k *13/02*
U.S. Cl. 228—6 4 Claims

ABSTRACT OF THE DISCLOSURE

An apparatus for aligning a first article, such as a beam-lead integrated circuit supported on a pivotally mounted tray with a reference image, and then operating a bonding head to pick up the circuit at an assembly position. The tray and bonding head are moved away from the assembly position and a conveyor is indexed to move a second article, such as a substrate, on a workholder beneath the bonding head. The workholder is lifted out of a nest in the conveyor and elevated to a bonding level where the substrate is aligned with the reference image after which the head is actuated to bond the beam-lead integrated circuit to the substrate.

BACKGROUND OF THE INVENTION

Field of the invention

This invention relates to apparatus for bonding devices to substrates, and more particularly, to methods of and apparatus for aligning separately a beam-lead integrated circuit and a substrate with respect to a reference image and then bonding the beam-lead integrated circuit to the substrate.

Description of the prior art

In the manufacture of integrated circuits, a plurality of interconnected semiconductor components and terminals are produced on a miniature size portion of a body of semiconductor material. Then, leads in the shape of beams are formed simultaneously to the terminals on the semiconductor body and extend in cantilever fashion therefrom to facilitate connection to external circuitry. The resulting structure is commonly referred to in the art as a beam-lead integrated circuit, or a beam-lead device, and is generally affixed on a substrate.

In order to connect the beam-lead device to external circuitry, it is usually necessary to bond the beam leads to conductive or contact areas or pads on the substrate.

One difficulty encountered in bonding beam-lead devices is that of accurately aligning the microscopic beam leads and the conductive areas on the substrate which are to be bonded together. Because the dimensions of the beam leads are relatively small, e.g., 9 mils in length, 4 mils in width, and 0.5 mil in thickness, it is important that the leads be accurately aligned with the conductive areas to insure that satisfactory electrical contact therebetween is obtained. The small size of the beam-lead devices and the requirement of accurate alignment of the leads with the conductive areas on the substrate present manufacturing difficulties when it is attempted to provide a bonding apparatus capable of automatic or semiautomatic operation.

Prior art methods and apparatus in the semi-conductor are not deemed adequate in all respects to overcome this problem. In some instances, such orientation has been accomplished manually, the operator selecting a beam-lead device and then aligning the device with conductive areas on the substrate by using commercially available optical systems and micromanipulator devices.

Also, some of the known manipulating apparatus are not capable of accurately positioning and bonding these parts with sufficient speed to provide an acceptable output rate. Moreover, even if considerable time is expended and the operator is diligent, assemblies bonded with prior art apparatus are many times nonuniform in structure and performance so as to keep production yield below that which may be desired.

In one prior art method and apparatus, alignment is achieved by viewing an integrated circuit through the underside of a transparent substrate. Difficulties are presented, however, when the substrate is opaque.

Some of the prior art apparatus require the operator to be highly skilled. Some apparatus demand that the manipulation be such that the operator becomes unduly fatigued in less than a normal working period. This undue fatigue reduces the speed of operation and lends to the nonuniformity or unacceptability of the bonded work product. The combined effect of these deficiencies is that it would be extremely difficult with available apparatus to produce high quality, bonded beam-lead devices on substrates in mass production quantities at a commercially acceptable cost.

Accordingly, it is an object of the present invention to provide new apparatus for accurately positioning microminiature parts and subassemblies in a predetermined relation, and of performing a precise operation thereon, all on a mass production basis. Moreover, it is an object to provide a novel micromanipulator for use in the bonding of beam-lead devices, having operator controlled mechanisms for bringing, separately, the devices and substrates into alignment for bonding wherein all movements and all visual observations by the operator are such as to minimize the fatigue factor.

Another complicating aspect of assembling successively a mass of beam-lead devices is that the movements of the substrate and the devices along a horizontal plane in order to align one with the other or with a reference are very minute; yet, comparatively large vertical distances must be traveled by the substrate into the bonding position. It must, therefore, be an object of any production apparatus for assembling beam-lead devices to provide equipment reliably capable of providing for accurate motion of the substrate in both of these greatly diverse ranges of displacement.

SUMMARY OF THE INVENTION

With these and other objects in mind, the present invention contemplates methods of and apparatus for assembling articles.

A suitable apparatus for assembling one of a plurality of first articles each having a particular outline with one of a plurality of second articles each having a corresponding pattern thereon, so that the outline is aligned with the pattern, includes an optical instrument having a reference reticle therewithin. The reticle contains a representation of both the outline and the pattern, for aligning a first article with a second article. One of the first atricles is brought into the focal plane of the optical instrument and is aligned with the reference reticle by suitable means including (a) a tray for holding first articles, (b) means for mounting the tray for movement into and out of the instrument's viewing area, (c) means for rotating the tray within the viewing area so that a selected first article can be aligned with respect to the reference reticle, and (d) means for adjusting the tray so that the first articles can be positioned to the focal plane. Means are provided for withdrawing a selected one of the first articles from the focal plane without disturbing its orientation. One of the second articles is brought into the focal palne and is aligned with the reference reticle by means of (a) a conveyor having spaced slots, (b) a tapered workholder mounted within each of the slots, (c) indexing means for moving the conveyor so that a workholder is moved into registration with the viewing area, (d) transporting means for moving the workholder transverse to the focal plane so that a second article supported thereon lies within the focal plane, and (e) mounting means for the transporting means to provide for longitudinal, transverse, and rotational movement so that the transported second article can be adjusted for alignment with respect to the reference reticle. Means are provided for returning the withdrawn first device to its aligned state within the focal plane whereby the first and second articles are aligned with respect to each other for assembly thereto.

Other objects and advantages of the present invention will be apparent from the following detailed description, when considered in conjunction with the accompanying drawings.

DETAILED DESCRIPTION

Figure 1:
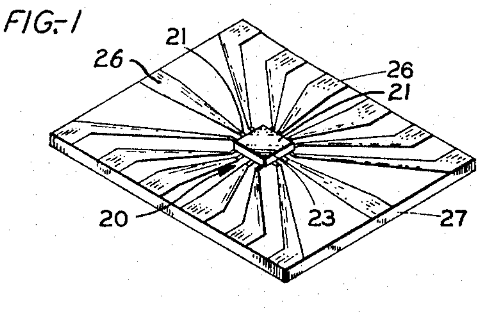
FIG. 1 is a perspective view of a metallized substrate wherein the beam leads of a beam-lead device have been bonded to contact areas of pads thereon.

Referring to FIG. 1, there is shown in perspective, a beam-lead device 20 having a plurality of beam-like leads 21—21 which are formed to terminals on the underside of a semiconductor body 23, the leads extending in cantilever fashion therefrom. It is desired that the leads 21—21 be attached to conductive areas 26—26 on a substrate 27.

Figure 2:
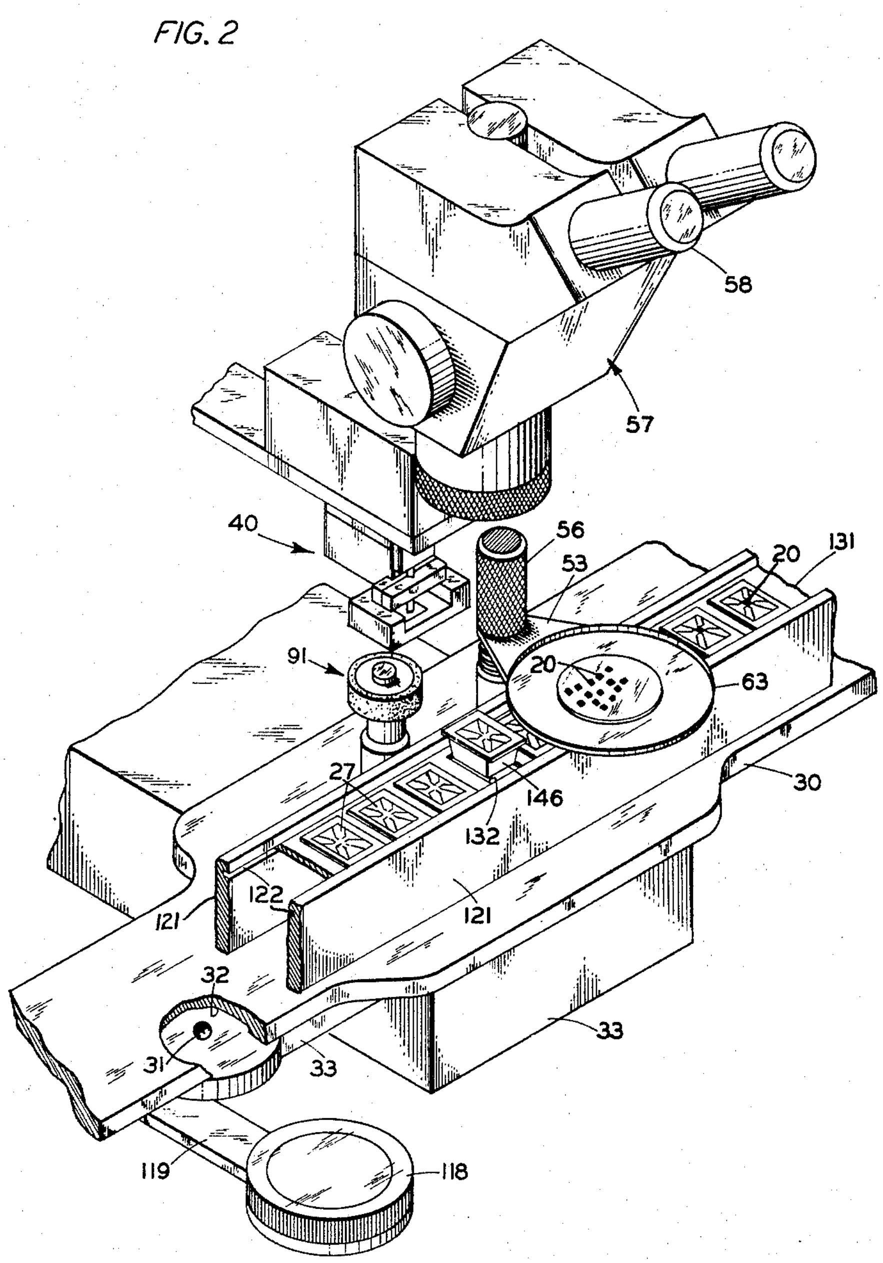
FIG. 2 is a perspective view, shown partly in cross-section with parts removed and broken away for the sake of clarity, in accordance with this invention, of apparatus including a pivotally mounted tray for supporting beam-lead devices, a conveyor for transporting substrates, an optical system incorporating a reference reticle therein to aid in aligning a device with the reticle image and a substrate with the reticle image, and a bonding head for bonding a beam-lead device to a substrate.

Referring to FIG. 2, suitable apparatus for attaching beam-lead devices to substrates, in accordance with one embodiment of this invention, includes a base plate 30 which is carried on the top flat surface of a support 33 by ball bearings 31 received in cavities 32 formed in the underside of the base plate.

Thus, as operator at a bonding station can move or translate the base plate 30 in an X–Y horizontal plane with respect to a bonding apparatus 40, described in detail in applicant's copending application Ser. No. 682,-454, entitled "Bonding Beam-Lead Devices to Substrates," filed Nov. 13, 1967, and assigned to the common assignee of this application.

A shaft 41 (see FIG. 5) has an intermediate portion thereof rotatably mounted within a bearing 42 of an upright housing 46 which is secured to the base plate 30 by stud bolts 47. The shaft 41 includes a flanged collar 43 which is supported on a top bearing surface 44 of the housing 46, the upper portion of the shaft 41 being received in a flanged hub 51.

The flanged hub 51 is spaced from the housing 46 by a compression spring 52 which is concentrically disposed about the shaft 41 and has a lower end thereof in bearing contact with the flanged collar 43. Moreover, the hub 51 is secured to the underside of a cantilevered platform 53 which extends laterally out from the shaft. The upper portion of the shaft 41 is threaded and the free end thereof extends upwardly past the top surface of the cantilevered platform 53. A washer 54 is placed over the free end of the threaded upper portion of the shaft 41 and then a knurled knob 56, having a threaded bore, is turned onto the threaded end of the shaft until the knob holds the washer 54 against the top surface of the platform 53.

A tray 63 (see FIGS. 2–5) is rotatably mounted onto the platform 53 by means, not shown. The tray 63 supports a plurality of coordinately arrayed beam-lead devices 20 (FIG. 2) for successive and individual bonding to substrates 27 at the bonding station. An operator focuses an optical system 57, having a reference reticle 58, with respect to the devices 20 on the tray 63; by turning the knurled knob 56 to move the platform 53 downwardly along the shaft 41 against the biasing force of the compression spring 52; and by turning the knob 56 in the opposite direction to permit the spring to urge the platform 53 upwardly along the shaft 41.

Figures 3, 9:
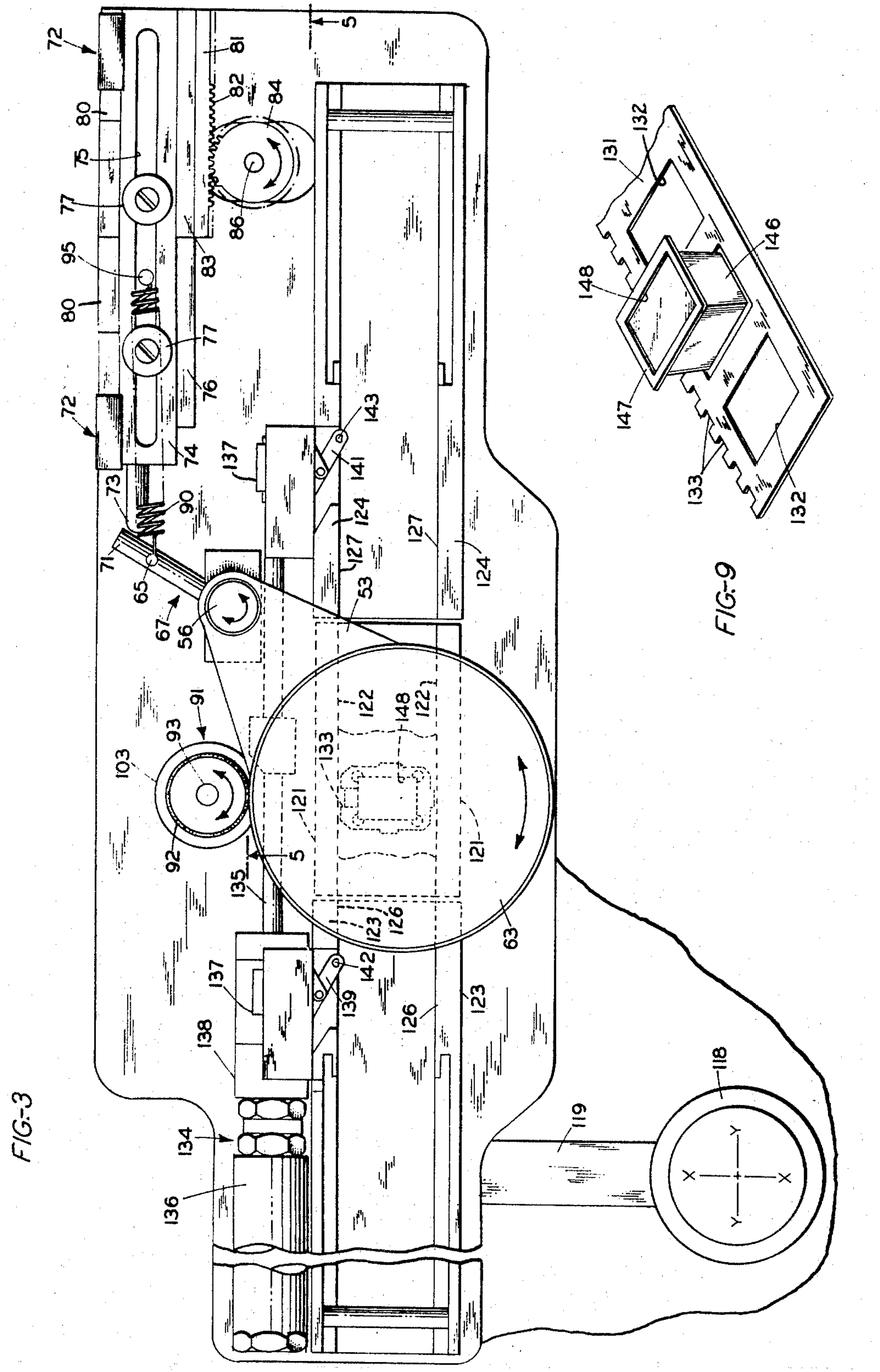
FIG. 3 is a plan view of the apparatus shown in FIG. 2.
FIG. 9 is a detailed, fragmentary view of the conveyor shown in FIG. 2, showing a portion of a rack with a work support lifted therefrom.
Figure 5:
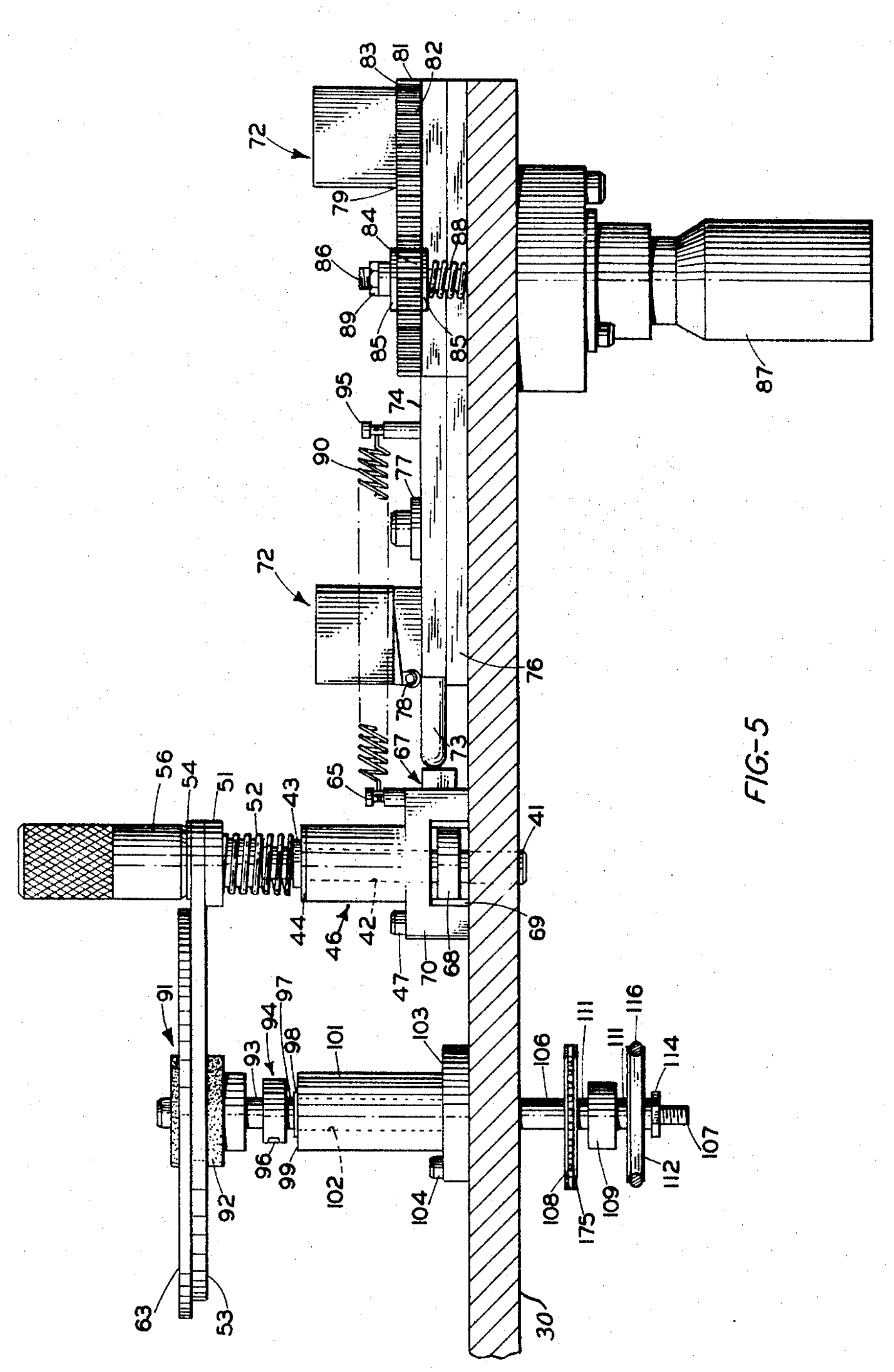
FIG. 5 is a sectional view taken along lines 5—5 in FIG. 3 and showing a mechanism for pivotally moving the tray which supports the plurality of beam-lead devices into and out of a position in alignment with the reference reticle.

As best seen in FIGS. 3 and 5, in order to pivot the platform 53, together with the tray 63, out of the work position after a selected beam-lead device 20 has been aligned with the reference reticle 58, an actuating arm 67, which extends through an opening 69 formed in an enlarged lower portion 70 of the housing 46, is secured by an eye 68 (FIG. 5), formed at one end thereof, to the shaft 41. A free end 71 of the arm 67 is engaged by a plunger 73 to rotate the shaft 41 and move the platform 53 and tray 63 out of the bonding or work position. As will be described in greater detail hereinafter, an upwardly extending post 65, attached to the arm 67, is coupled to a spring for urging the platform 53 in the opposite direction, into the bonding or work position.

The plunger 73 is attached to the forward end of a slide bar 74 which is slidably mounted on a support plate 76 mounted on the base plate 30. The bar 74 is maintained in sliding contact with the support plate 76 by a pair of spaced washer bolts 77—77 inserted through a slot 75 formed in the bar 74 and turned through threaded bores in the plates 76 and 30.

The bar 74 is positioned on the plate 76 so that one edge thereof slides under a pair of spaced-apart overchanging members 72—72, which are attached to a vertical side surface of the base plate 30. The left and right members 72—72, as viewed in the drawings, support limit switches 78 and 79, respectively. (The limit switch 79 is hidden from view in FIG. 5.) Moreover, cams 80—80, FIG. 3, are attached to the side of the bar 74 so that as the bar 74 slides to the left to pivot the platform 53, the left-hand cam 80 trips the switch 78. Similarly, as the bar 74 is moved to the right, as viewed in the drawings, the right-hand cam 80 trips the switch 79. (The cams 80—80 are omitted from FIG. 5 to simplify the drawing.) As will become apparent from the description of the operation of the apparatus, the switches 78 and 79 control a motor 87. Also, the cams 80—80 are adjustably secured to the slide bar 74 so that they may be positioned to stop the motor 87 corresponding to any predetermined location of the platform 53.

A rack 81, having a plurality of teeth 82 along one face thereof, is attached to an upstanding end 83 of the slide bar 74 (see FIGS. 3 and 5). The teeth 82 in the rack 81 mesh with teeth on a pinion 84. The pinion 84, positioned between washers 85—85, is placed over a spindle 86 that is secured to an upper end of a shaft (not shown) extending from the motor 87. A compression spring 88 is concentrically disposed about the spindle 86 and bears against the underside of the lowermost washer 85. Then, a pair of threaded nuts 89 (one shown in FIG. 5) are turned onto the spindle to securely hold the pinion 84 against the spindle 86 so that, when the motor 87 is operated to turn the spindle, the pinion is rotated therewith. As the motor 87 is operated to turn the spindle 86 and the pinion 84 in a counterclockwise direction, as viewed in FIG. 3, the plunger 73 is moved to the left to engage the arm 67 and rotate the shaft 41 (see FIG. 5).

When the plunger 73 is in a retracted, normally inoperative position, as shown in FIGS. 3 and 5, the platform 53 is held in the bonding/beam-lead device pick-up position by a tension spring 90 which is connected at one end thereof to the post 65, extending upwardly from the arm 67, and is attached at the other end to the upper end of a post 95 mounted on the support plate 76.

When the platform 53 and the tray 63 are held in the bonding/beam-lead device pick-up position by the tension force exerted by the spring 90, the peripheral face of the tray is in contact with a friction roller 91 (see FIGS. 2, 3, 4, 5 and 7). The friction roller 91 is proportioned to have a significantly greater thickness than the thickness of the peripheral edge of the tray 63. Moreover, the friction roller 91 has a ring 92 of frictional material attached to the peripheral surface thereof. The friction roller 91 is supported at the level of, and in registration with, the tray 63 by a shaft 93 which extends through an opening in the base plate 30.

A lower portion 97 of a collar 94, secured to the shaft 93 by a set screw 96 (see FIG. 5), abuts a top surface of a flanged bearing 98. The body of the bearing 98 is fitted within a bore 102 formed within a cylindrical bearing block 101, the flanged portion of the bearing 98 resting on a top annular surface 99 thereof. A flange 103 of the block 101 is secured to the base plate 30 by stud bolts 104. The lower portion 106 of the shaft 93 is fitted with a sprocket 108, a spacer 109 positioned between two washers 111—111, and a pulley 112. A lock nut 114 is placed over a threaded end 107 of the shaft 93 to hold the pulley on the shaft. The pulley 112 is driven by a belt 116 which is actuated through a system of pulleys and belts 117 by a hand-operated knob 118 (see FIGS. 2 and 7) to provide for fine movements of microminiature magnitude. The knob 118 can be mounted on an actuating arm 119 of a commercially available micromanipulator mechanism (see FIGS. 2 and 3), such as that manufactured by Lindberg/Hevi-Duty Division of Sola Basic Industries.

A selected beam-lead device 20 on the tray 63 can be aligned with the reference reticle 58 by the operator first moving the actuating arm 119 to move the base plate 30 (see FIG. 2). Since the platform 53 and tray 63 are attached to the base plate 30, as hereinbefore disclosed, the movement of the base plate moves the platform and tray and beam-lead devices with respect to the optical system 57 which is fixedly mounted, separate and apart from the base plate. Movement of the actuating arm 119 in any planar direction is terminated by the operator when a selected beam-lead device 20 has been moved into approximate alignment with the reference reticle 58. Then, the operator turns the knob 118 on the actuating arm 119, causing the belt 116 to rotate the pulley 112 to turn the shaft 92. As the shaft 93 is turned in a selected direction, the friction roller 91, engaged with the peripheral face of the tray 63, rotates the tray. The angular orientation of the tray 63 is adjusted until the beam-lead device 20 is exactly aligned with the reference reticle 58.

The base plate 30 also supports a pair of spaced-apart guide rails 121—121 (see FIGS. 2 and 3). Each of the guide rails 121 has a longitudinal way, or groove 122, formed therein which extends for the length of the guide rail. In addition to the guide rails 121—121, the base plate 30 also supports two pairs of side plates 123—123 and 124—124 located at opposite ends of the guide rails 121—121. As viewed in FIG. 3, the side plates 123—123 are adjacent to and spaced from the left ends of the guide rails 121—121, and the side plates 124—124 are adjacent to and spaced from the right end of the guide rails 121—121. Moreover, the side plates 123—123 and 124—124 are provided with longitudinal grooves 126—126 and 127—127, respectively, which are aligned with the grooves 122—122 in the guide rails 121—121 (see FIG. 3).

A rack 131 (see FIGS. 2, 4, and 9) having a plurality of rectangular openings 132—132 formed therein is slidably received in the aligned longitudinal grooves 126—126, 122—122 and 127—127 in the side plates 123—123, guide rails 121—121 and side plates 124—124, respectively. The rack 131 is provided with a row of notches 133 formed along one edge thereof (see FIG. 9) for engagement by a mechanism 134 (FIG. 3) for indexing the rack within the longitudinal grooves.

The indexing mecahnism 134 includes an air cylinder 136, supported by a block 138, which is mounted on the base plate 30 (see FIG. 3). The air cylinder 136 imparts reciprocating motion, via its piston, to a rod 135, having sliders 137—137 mounted thereon. A pair of spring-loaded pawls 139 and 141, having laterally extending drive pins 142 and 143, respectively, are mounted on the rod 135. The laterally extending drive pins 142 and 143 engage the notches 133 to couple the indexing mechanism 134 to the rack 131. As the air cylinder 136 is intermittenly operated to reciprocate the rod 135 and the sliders 137—137, the rack 131 is advanced to the right, as viewed in FIG. 3, to move successively each of the openings 132 in the rack into and then through the bonding position in alignment with the reference reticle 58.

Figure 4:
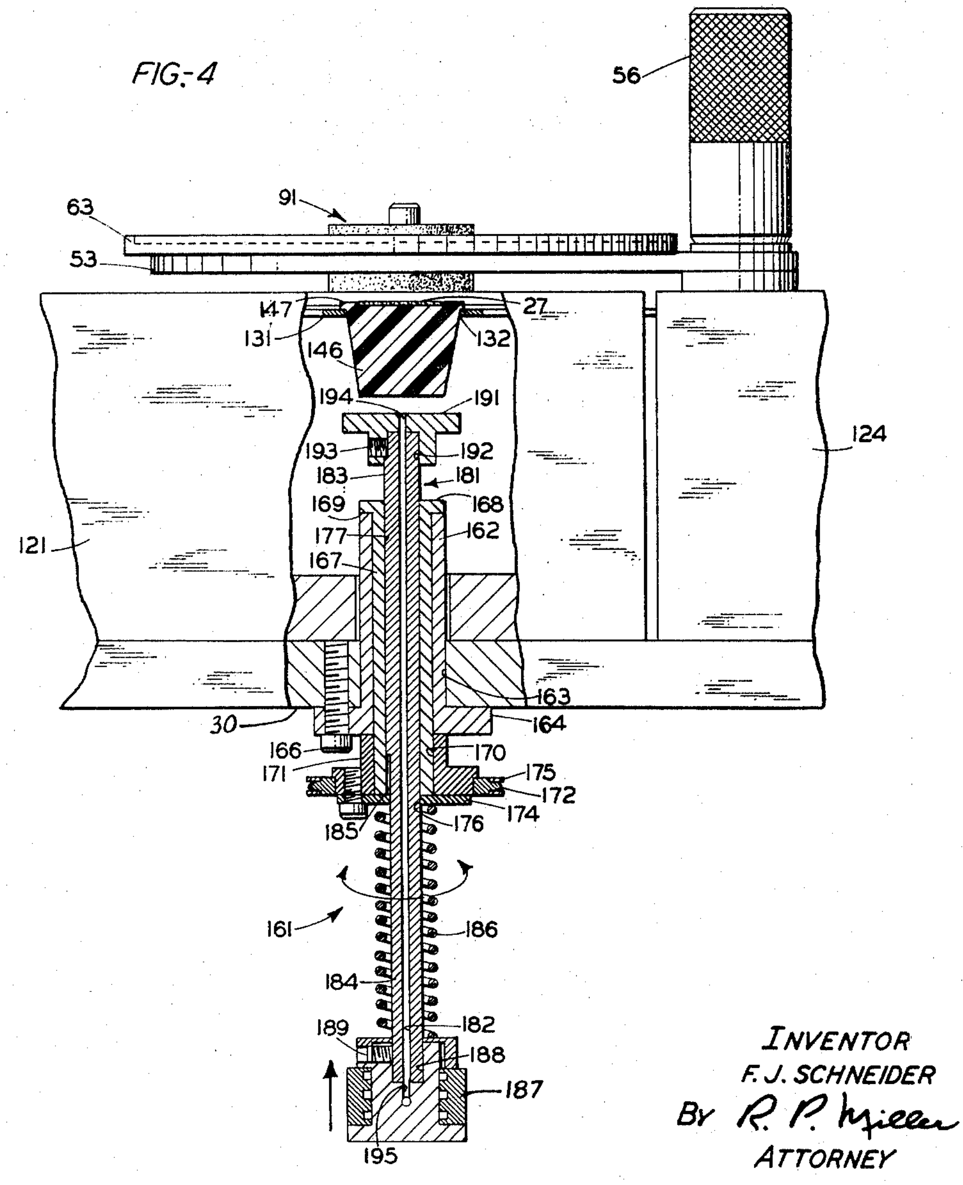
FIG. 4 is a front elevation view, partially cut away, of a portion of the apparatus shown in FIG. 2, showing in particular, a tray for supporting a plurality of the beam-lead devices positioned over a conveyor and further showing one of a plurality of work supports together with a lifting and turning device for the work supports.

A workholder 146 is received in each of the openings 132 in the rack 131 (see FIGS. 2, 4 and 9). As is shown in FIG. 4, each of the workholders 146 has tapered sides to facilitate the insertion and removal of the workholder into and out of the openings 132 in the rack 131. Moreover, by constructing the workholders 146 with tapered sides, the workholders, when inserted into one of the openings 132 in the rack 131, are self-centering. In order to prevent the workholder 146 from falling through its respective opening 132, the workholder has a flange 147 formed integrally with the top surface thereof to support the workholder on the top surface of the rack 131. Also, the flange 147 is formed with a recess 148 for receiving and holding a substrate 27 for movement into registration with the optical system 57.

The rack 131 is advanced to the right, as viewed in FIGS. 2 and 3, to position successively each of the substrates 27 in each of the recesses 148 in successive workholders 146 beneath the optical system 57. As the rack 131 is advanced, it may be advanced through a heating unit (not shown) to heat the substrates 27 to facilitate bonding of the beam-lead devices 20 to the substrates.

Then, the substrates 27 are aligned precisely with the reference reticle 58 by a lifting and orienting mechanism 161 (see FIGS. 4, 6 and 7) which is also mounted on the base plate 30 for translatory movement in the X–Y horizontal plane. The reference reticle 58 has imprinted thereon an image of the assembled device with outlines of the beam-lead device 20 and substrate 27 to permit accurate alignment. The substrate lifting and orienting mechanism 161 is shown in detail in FIGS. 4 and 6 and includes a sleeve 162 which is received in an opening 163 in the base plate 30. The sleeve 162 has a flange 164 formed thereon, abutting the underside of the base plate 30 and attached thereto by bolts 166.

A second sleeve 167 is received within the first sleeve 162 and has a flange 168 formed on an upper end thereof. The flange 168 is supported on an upper, unflanged end 169 of the first sleeve 162. The second sleeve 167 extends below the base plate 30 and the flange 164 of the first sleeve 162, and is received in a bore 170 of a hub 171 on which is mounted a sprocket 172. A cover plate 174 is fastened on the underside of the sprocket 172 and has an opening 176 formed therein and aligned concentrically with a bore 177 in the second sleeve 167.

A chain 175 circumscribes the sprocket 172 on the lifting and orienting mechanism 161 and connects with the sprocket 108 on the shaft 93 (see FIG. 5). In this way, whenever the operator turns the knob 118 on the actuating arm 119 to turn the shaft 93 and rotate the friction roller 91, rotary motion is also transmitted by the chain 175 to the sprocket 172 (see FIG. 7).

As is shown in FIG. 4, a lifting rod 181 is slidably received in the bore 177 of the second sleeve 167 and has a longitudinal passageway 182 formed therethrough. The lifting rod 181 is formed with an upper portion 183 having a diameter approximately equal to the diameter of the bore 177 in the second sleeve 167, and is formed with a lower portion 184 having a flat 185 formed thereon by cutting the lower portion along a chordal line. The opening 176 in the cover plate 174 corresponds approximately in cross section with that of the lower portion 184 of the lifting rod 181. The lifting rod 181 has a limited downward travel within the bore 177 of the second sleeve 167. Moreover, when the sprocket 172 is turned, the plate 174, which is secured to the hub 171 on which the sprocket is mounted, is turned therewith. Since the plate 174 contacts the flat 185 of the lifting rod 181, the lifting rod is turned along with the sprocket 172 and plate.

The upward movement of the lifting rod 181 is resisted by a compression spring 186 which is concentrically disposed about the lifting rod. The spring 186 has an upper end engaging the cover plate 174 and has a lower end engaging an end cap 187. The end cap 187 has a cavity 188 therein for receiving the lower portion 184 of the lifting rod 181 and is secured to the rod by a set screw 189.

The upper end 183 of the lifting rod 181 is fitted with a pedestal cap 191 having a cavity 192 therein for receiving the upper end of the rod 181, being secured thereto by a set screw 193. The cap 191 has a centrally formed bore 194 therethrough which is aligned with the passageway 182 in the rod. The lower end cap 187 has an opening 195 therein which is aligned with the longitudinal passageway 182 in the lifting rod. The opening 195 communicates via a passageway 196 and a flexible conduit 190 extending laterally of the cap 187 (see FIG. 6), with a vacuum source (not shown).

An underside 197 of the lower end cap 187 rests on an actuator lug 198 which projects from a lever 199. The lever 199 is pivotally mounted on a pin 201 which is supported between side plates 202 and 203 of a generally L-shaped hanger 204, which is secured to the underside of the base plate 30. The lever 199 is biased in a counterclockwise direction, as viewed in FIG. 6, by a tension spring 205 attached to the underside of the base plate 30 at one end and to a stud 206 attached to and extending transversely from the lever (see FIG. 6).

The other end of the lever 199 has an actuated lug 207 which is engaged by a contact plate 208 that is attached to one end of a piston rod 209 extending from an air-operated cylinder 211. The actuation of the air cylinder 211 moves the piston rod 209 and contact plate 208 downwardly against the lug 207 to overcome the force of the spring 205 and pivotally move the lever 199 about the pin 201. As the lever 199 is pivoted clockwise, as viewed in FIG. 6, the actuator lug 198 moves the lifting rod 181 upwardly within the bore 177 of the second sleeve 167 and compresses the spring 186.

Figure 7:
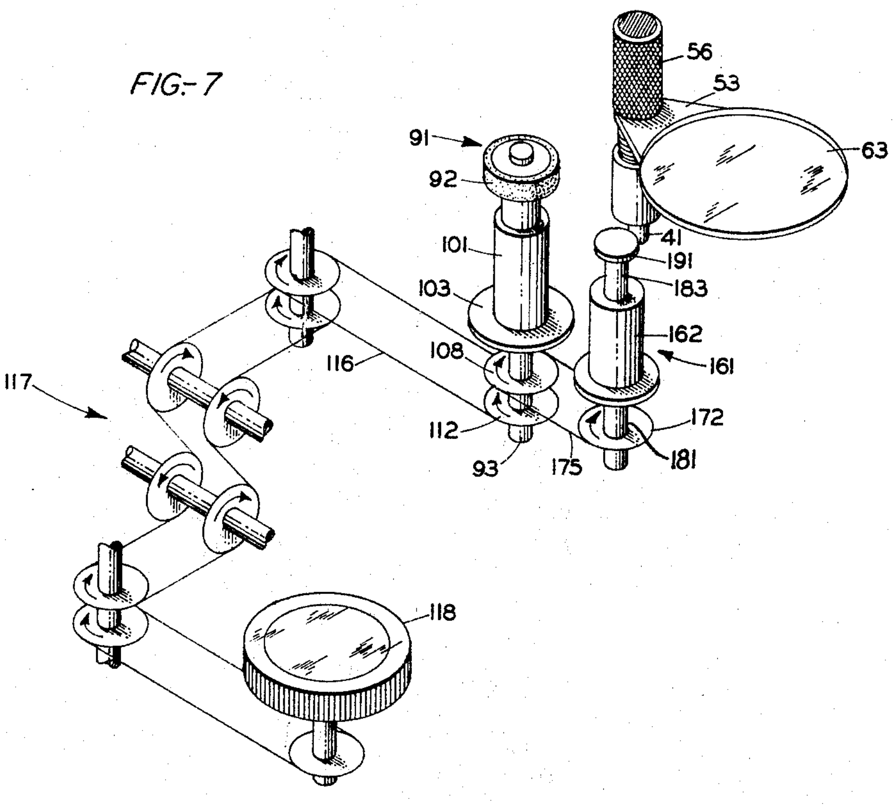
FIG. 7 is a perspective schematic view of a mechanical system for aligning the beam-lead devices and the substrates with reference reticle image of the optical system.

The lifting rod 181 is rotated by the operator by turning the knob 118 which rotates the sprocket 108 and the chain 175 to turn the sprocket 172 and the lifting rod (see FIG. 7). In this way, when the air cylinder 211 is operated to raise the lifting rod 181, to engage and raise one of the substrates 27 in the recess 148 of one of the workholders 146 to a bonding level, the substrate can be oriented with respect to the beam-lead device 20 and the reference reticle 58.

OPERATION

In the operation of one embodiment of this invention, a plurality of beam-lead devices 20—20 with leads oriented downwardly are spread, or alternatively coordinately arrayed, in a single plane upon the upper surface of the tray 63 (see FIG. 2). One of the beam-lead devices 20 on the tray 63, presumably the first device in a row and column, is then aligned with the pickup position of the bonding head of the apparatus 40 by utilizing the reference reticle 58 of the optical system 57.

The alignment is accomplished by simultaneously viewing the beam-lead device 20 with the optical system 57 and operating the arm 119 to move the base plate 30 in the X–Y horizontal plane and then by turning the knob 118 to drive the belt 116 and turn the pulley 112 (see FIG. 7). As the pulley 112 is turned, the shaft 93 is rotated to turn the friction roller 91. Since the peripheral face of the tray 63 is held in contact with the friction roller 91 by the tension spring 90 connected to the post 65 on the arm 67 extending from the shaft 41, the rotation of the friction roller 91 in a clockwise direction will turn the tray 63, and hence the beam-lead devices 20—20 on the tray 63, in a counterclockwise direction. Similarly, counterclockwise rotation of the friction roller 91 turns the tray 63 in a clockwise direction.

It should be apparent from FIG. 7 that since the sprockets 108 and 172 on the shaft 93 and lifting rod 181, respectively, are coupled together by the chain 175, the rotation of the pulley 112 rotates both the shaft and the lifting rod. However, since the lifting rod 181 has not been raised into engagement with one of the workholders 146 at this point in the operation of the apparatus, the rotation of the lifting rod, at this time, does not affect the remainder of the apparatus.

Figure 10:
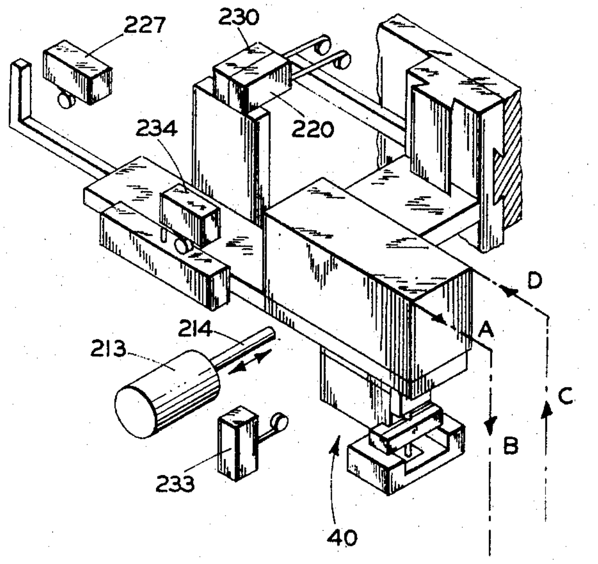
FIG. 10 is a perspective view of a bonding head for use with the apparatus shown in FIG. 2.
Figure 8:
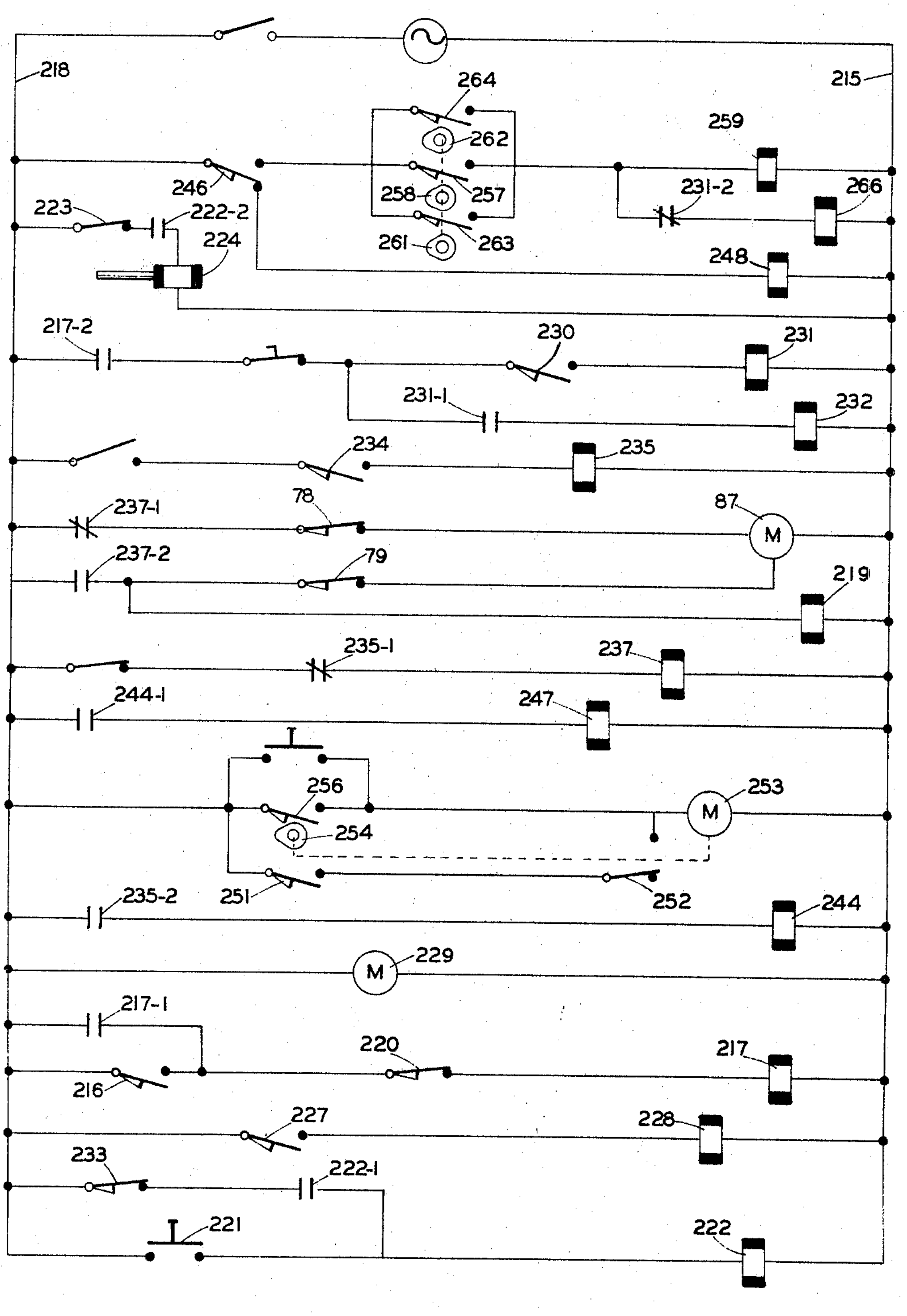
FIG. 8 is an electrical schematic of a circuit for operating apparatus in accordance with one embodiment of this invention.

Referring now to FIG. 8, there is shown an electrical circuit suitable for use in controlling the apparatus for carrying out the method of this invention. At this time in the cycle of operation of the apparatus, a normally open limit switch 216 is held closed by the actuator plate 208 (see also FIG. 6). A circuit is completed from a power source, through a line 218, through the switch 216, and through a normally closed limit switch 220, a relay 217, and a return line 215, back to the power source. The relay 217 enregizes and closes two pairs of normally open contacts 217–1 and 217–2. A relay 237, which is now energized via a switch (unlabelled) and normally closed contacts 235–1 of a step relay 235 (now unenergized), causes normally open contacts 237–2 to close. The closed contacts 237–2 complete a circuit to energize a solenoid 219. The solenoid 219 actuates a valve (not shown) to operate a pneumatic cylinder 213 (see also FIG. 10) to move a shim 214 under the bonding apparatus 40 to limit the downward movement thereof.

Then, after the alignment of a selected one of the beam-lead devices 20 on the tray 63 at the pickup position is completed, the operator depresses a push-button switch 221 to complete a circuit to energize a relay 222 which completes a locking circuit, via a one-way limit switch 233 (now closed), by closing normally open contacts 222–1. At the same time, normally open contacts 222–2 are closed to complete a circuit through a closed switch 223 to energize a solenoid 224 which activates a driving mechanism to move the bonding apparatus 40 forward on a first stroke (path designated A, see FIG. 10) toward the pickup position. As the bonding apparatus 40 is moved forward, it engages a one-way limit switch 227 to energize a clutch solenoid 228 which operates a one-way clutch (not shown) to connect a continuously turning motor 229 to a cam drive (not shown) to move the bonding apparatus downwardly (path designated B, FIG. 10). The bonding apparatus 40 can be of the type described in applicant's copending application, Ser. No. 682,454, entitled "Bonding Beam-Lead Devices to Substrates," filed Nov. 13, 1967, and assigned to the common assignee of this application. The bonding tip of the apparatus is prevented from being moved to the lower limit of vertical travel by the shim 214 which is held in position under the head by the solenoid actuated pneumatic cylinder 213 (see FIG. 10).

When the bonding head 40 reaches the selected beam-lead device 20, a limit switch 230 (see also FIG. 10) is tripped by the descending head to complete a circuit through now closed contacts 217–2 of the energized relay 217 to energize a relay 231. Energization of the relay 231 closes normally open contacts 231–1 to complete a locking circuit to a solenoid 232 which opens a valve (not shown) to apply a partial vacuum through a tube in the bonding head. The vacuum applied through the tube exerts a force on the selected beam lead device to hold it against the end of the tube. At this point, the tube is drawn into the bonding head to position the beam-lead device 20 therewithin and bring its leads 21—21 of the beam lead into engagement with a bonding surface on the head.

As the motor 229 rotates, the aforesaid cam drive is also moved to retract the bonding apparatus 40 upwardly (see path designated C, FIG. 10) with the selected beam-lead device 20 held thereto. The upwardly moving head trips the one-way limit switch 233 which interrupts the holding circuit for the relay 222. When the relay 222 is deenerigzed, the locking contacts 222–1 and contacts 222–2 are opened. The opening of the contacts 222–2 deenergizes the solenoid 224 which reverses the driving mechanism to return the bonding apparatus 40 rearwardly to an initial position behind the pickup position (see path designated D, FIG. 10). When the bonding apparatus 40 is moved rearwardly, one-way limit switch 234 is tripped to energize the step relay 235. The energization of the step relay 235 opens normally-closed contacts 235–1 to deenergize the relay 237.

When the relay 237 is deenergized, normally closed contacts 237–1 close, and normally open contacts 237–2 open, completing a circuit through the normally closed limit switch 78, to drive the reversible motor 87 (see also FIGS. 3 and 5) in one direction to turn the spindle 86 and the pinion 84. The rotation of the pinion 84 which is meshed with the teeth 82 on the rack 81, advances the rack to the left, as viewed in FIG. 3, and urges the plunger 73 against the arm 67. As the plunger 73 is urged against the arm 67 extending from the shaft 41, the tension force in the spring 90 is overcome and the arm is oscillated to rotate the shaft 41 and pivot the platform 53 and tray 63 out from under the optical system 57. As the bar 74 is advanced to the left, as viewed in FIG. 5, the tray 63 moves to a predetermined position out from over the pedestal cap 191, the left cam 80 opens the switch 78 causing the motor 87 to halt. Also, when the relay 237 is deenergized and the contacts 237–2 open, the solenoid 219 is deenergized, retracting the pneumatic cylinder 213, thus removing the shim 214 from the path of downward travel of the bonding apparatus 40.

As the step relay 235 energizes, normally open contacts 235–2 are closed to complete an energizing circuit through a time delay relay 244. After a preset time in the order of a few seconds, contacts 244–1 of the time delay relay 244 are closed to energize a solenoid 247 which opens a valve (not shown) to apply air to the air cylinder 211 (see also FIG. 6) to move the piston rod 209 and urge the contact plate 208 against the lug 207 to pivot the lever 199. As the lever 199 pivots clockwise about the pin 201, supported between the side plates 202 and 203, the actuator lug 198 is moved upwardly, as viewed in FIG. 6. When the lug 198 is moved upwardly against the underside 197 of the lower end cap 187, the lifting and orienting mechanism 161 is raised, compressing the spring 186 between the cap and the cover plate 174.

As the pedestal cap 191 is lifted, the switch 216 (see again FIG. 6) is opened, but the relay 217 is held energized by the locking circuit through the now closed locking contacts 217–1.

A switch 246 (see FIG. 6), normally held in a down position, as shown in FIG. 8, completes a circuit through a solenoid 248 to energize the solenoid and open a valve (not shown) to supply a partial vacuum through the passageway 196 and flexible conduit 190 in the end cap 187, the opening 195 and the passageway 182 in the lifting rod 181 to hold the workholder 146 against the pedestal cap 191. As the spring 186 is compressed, and the lifting rod 181 raises slidably within the second sleeve 167, the lifting rod 181 raises the cap 191, and the workholder 146 that is currently positioned at the bonding position, partially out of the opening 132 in the rack 131 to raise the substrate 27 to approximately the same plane and predetermined spatial location at which the beam lead device was initially picked up from the tray 63.

Then, the base plate 30, together with the substrate 27, is translated, by the operator, by moving the actuating arm 119. The substrate is rotated by turning the knob 118 to rotate the lifting rod 181. As the lifting rod 181 and cap 191 are translated and then turned, the substrate is moved into the predetermined spatial location and aligned with an image imprinted on the reference reticle 58. The same fixedly-positioned optical system 57 which is used to align the beam-lead device 20 with the bonding apparatus 40 prior to pick up is used to orient the substrate 27 with respect to the image on the reference reticle 58.

After the substrate 27 moves into the predetermined spatial location in alignment with the image on the reference reticle 58, the operator again depresses the pushbutton switch 221 to again energize the relay 222 and, locking same due to the closure of the normally open contacts 222–1. The normally open contacts, 222–2, now closed, complete a circuit to energize the solenoid 224 and actuate the valve (not shown) which operates the rotary device to move the bonding apparatus 40 forwardly toward the substrate 27 until the head engages and activates the momentary one-way limit switch 227 (see FIG. 10). The switch 227 completes a circuit for controlling the solenoid 228 to actuate the single revolution clutch to connect the motor 229 and the cam (not shown) to drive the bonding head downwardly.

As the bonding head is driven downwardly by the motor 229 and the cam, the bonding apparatus 40 engages the switch 230. However, vacuum is still supplied to the head through a valve (not shown) held open by the solenoid 232 energized by the locking circuit completed previously through the contacts 231–1.

The bonding head is moved to a lower position than that at which the beam-lead device 20 was picked up since it will be recalled that the solenoid 219 was deenergized to remove the shim 214. Then, as the selected beam-lead device 20 is placed into engagement with the substrate 27 on the raised pedestal cap 191, and the leads 21—21 of the beam-lead device 20 are moved into firm contact with the conductive areas 26 on the substrate 27, the bonding head trips and opens the normally closed momentary limit switch 220.

When the switch 220 opens, the relay 217 deenergizes and the contacts 217–1 and 217–2 open, interrupting the energizing circuit to the relay 231 and deenergizing the solenoid 232 to operate a valve (not shown) and disconnect the vacuum supply.

As the bonding head is withdrawn upwardly by rotation of the motor 229 the normally closed limit switch 233 again opens, deenergizing the relay 222, opening the contacts 221–2 and 222–2. The solenoid 224 deenergizes, operating the rotary pneumatic device to return the bonding head rearwardly out of the bonding position. As it moves rearwardly, the head trips the limit switch 234 which again operates the step relay 235 to close the contact 235–1 to energize the relay 237.

The now closed contacts 237–1 reopen and now opened contacts 237–2 reclose, applying A.C. power to a different winding of the motor 87, to reverse it, moving the plunger 73 away from the arm 67. The tension spring 90 exerts a force on the arm 67 to urge the shaft 41 in a clockwise direction to rotate the platform 53 and the tray 63, together with the remainder of the beam-lead devices 20—20 back under the optical system 57. The right-hand member 72, as viewed in FIG. 3, is positioned so that when the tray 63 is back under the optical system, a cam bar 80 trips the switch 79 to discontinue operation of the motor 87.

Also, the solenoid 219 energizes, reinserting the shim 214 in the line of vertical travel of the bonding head so that, on the first descent of the bonding head on the next cycle, the pickup tube (tube 41 in copending application Ser. No. 682,454) within the head, and not the tip of the head, per se, will descend to the bonding level for picking up the next beam-lead device.

Moreover, when the step relay 235 is operated, the contacts 235–2 open, deenergizing the time delay relay 244, thereby opening the contacts 244–1 and deenergizing the solenoid 247 to operate the air valve (not shown). This air valve operates the air cylinder 211 to withdraw the piston rod 209 and move the contact plate 208 away from the lug 207, thus permitting the spring 205 to pivotally move the lever 199 about the pin 201 in a counterclockwise direction, as viewed in FIG. 6. As the lever 199 turns, the contact plate 208 moves upwardly. The lug 198 is moved downwardly and allows the compression spring 186 to force its lifting rod 181 downwardly. The lifting and orienting mechanism 161 is lowered to return the workholder 146 to rest the flange 147 on the walls of the rack 131 surrounding the recess 132. Also, as the pedestal cap 191 assumes a lower position, the plate 208 trips the switch 246 (see FIGS. 6 and 8) to move the switch upwardly, as shown in FIG. 8, to deenergize the solenoid 248, operating a valve to shut off the vacuum in the lifting and orienting mechanism 161.

Also, as the pedestal cap 191 is lowered, a one-way momentary limit switch 251 is closed by the upward movement of the contact plate 208 to complete a circuit therethrough through a switch 252 (which is in an up, or automatic, position, as viewed in FIG. 8), to actuate a cam timer 253. As the cam timer 253 begins to turn, a cam 254 closes a switch 256 which completes a holding circuit through the cam timer 253 which circuit bypasses the momentarily closed switch 251. After one revolution of the timer 253, the switch 256 opens to stop the timer.

Figure 6:
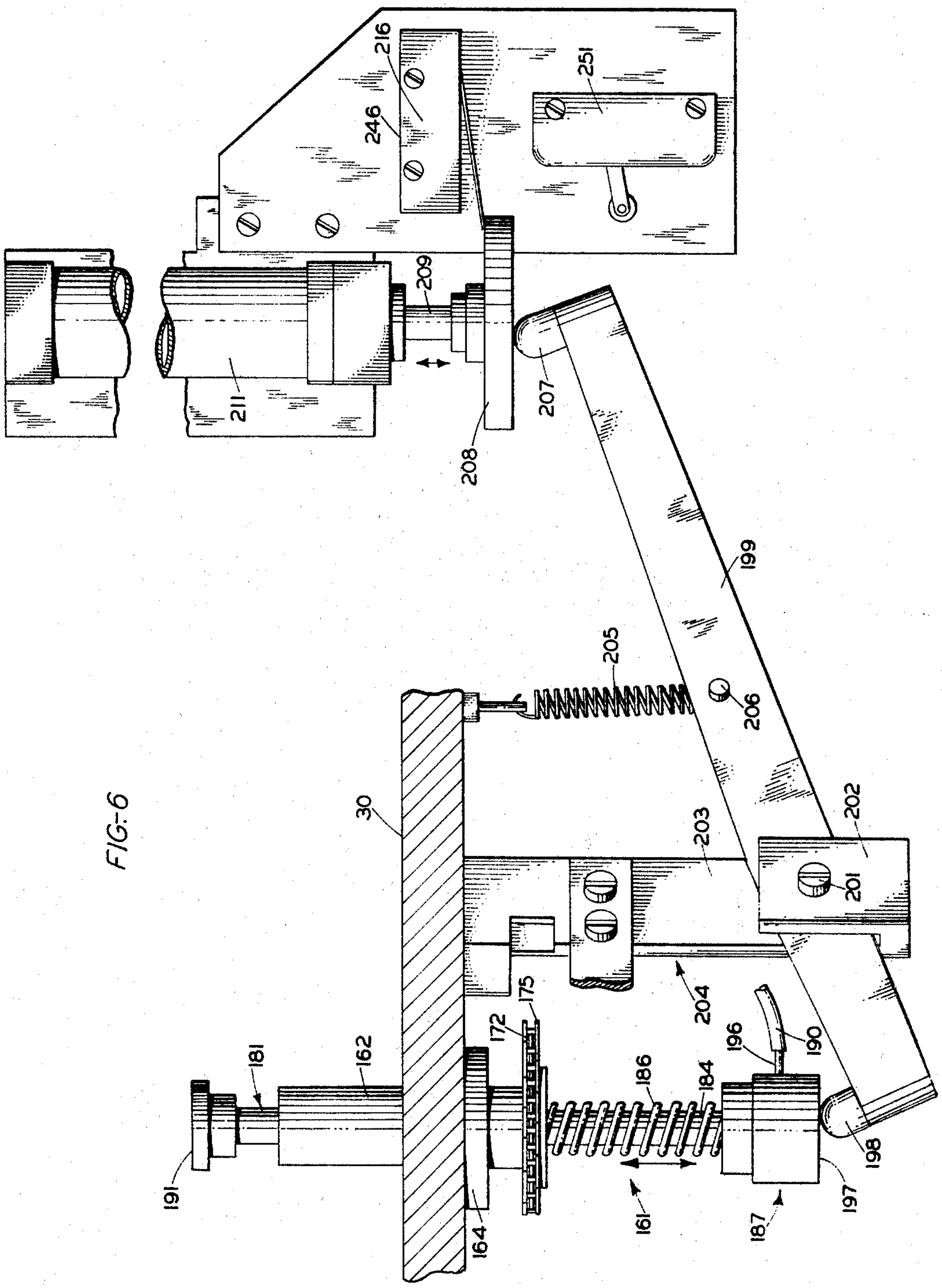
FIG. 6 is a side elevational view, partially in section, of the lifting and turning device shown in FIG. 4 for lifting, turning, and translating a work support and the metallized substrate supported thereon.

When the pedestal cap 191 is down and the contact plate is up, as viewed in FIG. 6, the switch 246 is in the up position, as viewed in FIG. 8, to complete a circuit through a switch 257, now closed by a cam 258, to energize a solenoid 259. The solenoid 259 operates a valve (not shown) to supply air to operate the cylinder 136 to advance the rod 135 to the right, as viewed in FIG. 3, to advance the rack 131 by a predetermined step to move a workholder 146 into position beneath the reticle 58. On the other hand, if the pedestal cap 191 is in an up position, and the actuator plate 208 has been moved downwardly as viewed in FIG. 6, the switch 246 is down hereby interrupting the circuit through the solenoid 259, preventing any indexing of the rack 131.

As the cam timer 253 turns to rotate the cam 258, and cams 261 and 262, the switch 257, as well as switches 263 and 264, respectively, are closed, then opened, to sequentially energize and deenergize a solenoid winding 266 of a valve (not shown) to pulse an air supply through the tube in the head 40 to clean out the tube of any matter which may become lodged therein.

It should be readily apparent that other alternative constructions are available which would still fall within the scope of the invention. For example, the workholders 146 need not have tapered sides and may be of any shape. Moreover, a ribbon-like rack having nesting slots formed therein may be used to support the substrates with the lifting rod 181 directly engaging and lifting the substrates.

It is to be understood that the above-identified embodiments are simply illustrative of the principles of the invention and numerous other modifications may be devised without departing from the spirit and scope of the invention.

What is claimed is:

1. In an apparatus for assembling a first article to a second article with a bonding tool at an assembly position;

(A) means for supporting a mass of first articles at said assembly position and for aligning a selected one of said first articles with respect to said bonding tool;

(B) means for holding said selected one of said first articles in alignment with said bonding tool;

(C) means for withdrawing said aligned selected first article out of said assembly position;

(D) means responsive to withdrawing said aligned selected first article for removing the remainder of said mass of first articles from said assembly position;

(E) means responsive to the removal of said mass from said assembly position for conveying a leading one of a plurality of said second articles into said assembly position;

(F) means for moving said leading one of said second articles for alignment with said bonding tool; and (G) means for returning said withdrawn first article to said assembly position for engagement with said aligned second article.

2. In an apparatus for assembling a first article to a second article with a bonding tool at an assembly position;

means pivotally mounted for supporting a mass of first articles in a planar array at said assembly position for selective translatory and rotational movement thereat;

means for selectively translating and rotating said supporting means to align one of said first articles with said bonding tool;

means for holding said selected one of said first articles aligned with said tool;

means for pivoting said supporting means and the remaining mass of said first articles out of said assembly position;

means mounted for translatory and rotational movement for transferring a leading one of a plurality of spaced second articles to said assembly position;

means for selectively adjusting said last named transferring means to align said leading one of said second articles with said bonding tool;

means for bonding said selected first article to said leading one of said second articles; and means responsive to the bonding of said first article to said second article for returning said supporting means to said assembly position to align a next successive first article in said mass with said bonding tool.

3. Apparatus for assembling one of a plurality of first articles each having a particular outline with one of a plurality of second articles each having a corresponding pattern thereon, so that the outline is aligned with the pattern comprising:

(A) an optical instrument having a reference reticle therewithin, said reference reticle containing a representation of said outline and said pattern, for aligning one of said first articles with one of said second articles;

(B) means for bringing one of said first articles into the focal plane of said optical instrument and for aligning said one first article with said reference reticle, including:

(1) a tray for holding a plurality of such first articles, (2) means for mounting said tray for movement into and out of the viewing area of said optical instrument, (3) means for rotating said tray within the viewing area of said instrument, so that a selected one of said first articles can be aligned with respect to said reference reticle, and (4) means for adjusting said tray in a direction transverse to said focal plane so that said first articles can be positioned to said focal plane;

(C) means for withdrawing a selected one of said first articles from said focal plane without disrupting its orientation;

(D) means for bringing one of said second articles into said focal plane of said optical instrument and for aligning said one second article with said reference reticle, including:

(1) an elongated conveyor having a series of spaced slots, (2) a plurality of workholders, each having tapered sides and mounted respectively in said slots, each of said workholders being adapted to support a corresponding second article thereon, (3) means for indexing said conveyor to move a leading one of said workholders into registration with the viewing area of said optical instrument, (4) means for transporting the leading workholder in a direction transverse to the focal plane so that the corresponding second device lies within the focal plane of said optical instrument, the tapered side of said workholder being moved with respect to but lying within its associated slot, and (5) means for mounting said last named means for longitudinal, transverse, and rotational movement, whereby said transported second article can be selectively adjusted for alignment with respect to said reference reticle; and (E) means for returning said one withdrawn first article to its aligned state within said focal plane;

whereby said one first article and said one second article are aligned with respect to each other for assembly thereto.

4. Apparatus as defined in claim 3 wherein said first articles are beam-lead integrated circuits and said second articles are circuit substrates having conductive areas for mating with the beam leads of said integrated circuits, and further comprising bonding means for assembling the beam leads of said integrated circuits to the corresponding conductive areas of said substrates.

References Cited

UNITED STATES PATENTS

| | | | |
|---|---|---|---|
| 3,051,026 | 8/1962 | Da Costa ____________ | 228—6 |
| 3,310,216 | 3/1967 | Kollner et al. ________ | 228—5 |

THOMAS H. EAGER, Primary Examiner

U.S. Cl. X.R.

29—203; 228—8